United States Patent
Cantin

(10) Patent No.: US 9,691,021 B2
(45) Date of Patent: *Jun. 27, 2017

(54) ADAPTIVE CATACLYSMS IN GENETIC ALGORITHMS

(71) Applicant: International Business Machines Corporation, Armonk, NY (US)

(72) Inventor: Jason F. Cantin, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 835 days.

This patent is subject to a terminal disclaimer.

(21) Appl. No.: 14/041,161

(22) Filed: Sep. 30, 2013

(65) Prior Publication Data

US 2014/0344197 A1    Nov. 20, 2014

Related U.S. Application Data

(63) Continuation of application No. 13/897,584, filed on May 20, 2013, now Pat. No. 9,305,257.

(51) Int. Cl.
   *G06N 5/00*   (2006.01)
   *G06F 1/00*   (2006.01)
   *G06N 3/12*   (2006.01)

(52) U.S. Cl.
   CPC ..................... *G06N 3/12* (2013.01)

(58) Field of Classification Search
   CPC .......... G06N 3/126; G06N 3/12; G06N 19/22; G06N 7/00; G06F 19/22
   See application file for complete search history.

(56) References Cited

U.S. PATENT DOCUMENTS

| 5,343,554 A | 8/1994 | Koza et al. |
| 5,363,098 A | 11/1994 | Antoshenkov |
| 5,390,283 A | 2/1995 | Eshelman et al. |
| 5,443,076 A | 8/1995 | Bau |

(Continued)

FOREIGN PATENT DOCUMENTS

| WO | 9963997 | 12/1999 |
| WO | 0167186 | 9/2001 |

(Continued)

OTHER PUBLICATIONS

Application of catastrophic adaptive genetic algorithm to reactive power optimization system, Liu Xing-Rong et al., 2010.*

(Continued)

*Primary Examiner* — Stanley K Hill
*Assistant Examiner* — Kalpana Bharadwaj
(74) *Attorney, Agent, or Firm* — DeLizio Law, PLLC

(57) ABSTRACT

It is determined that a population of candidate solutions for an optimization problem has prematurely converged during a metaheuristic optimization run. A cause for premature convergence of the population is determined based, at least in part, on an analysis of the metaheuristic optimization run. A first cataclysm strategy of a plurality of cataclysm strategies is selected based, at least in part, on one of the cause of the premature convergence and a history of the metaheuristic optimization run. A cataclysm is simulated based, at least in part, on the first cataclysm strategy.

17 Claims, 4 Drawing Sheets

(56) References Cited

U.S. PATENT DOCUMENTS

| | | | |
|---|---|---|---|
| 5,581,657 A * | 12/1996 | Lyon | G06N 3/126 706/13 |
| 5,651,099 A | 7/1997 | Konsella | |
| 5,742,738 A | 4/1998 | Koza et al. | |
| 5,857,196 A | 1/1999 | Angle et al. | |
| 5,946,674 A | 8/1999 | Nordin et al. | |
| 6,031,935 A | 2/2000 | Kimmel | |
| 6,057,424 A | 5/2000 | Vail | |
| 6,058,385 A | 5/2000 | Koza et al. | |
| 6,128,607 A | 10/2000 | Nordin et al. | |
| 6,260,031 B1 | 7/2001 | Schaffer et al. | |
| 6,442,582 B1 | 8/2002 | Hale | |
| 6,532,076 B1 | 3/2003 | Sidorowich | |
| 6,532,453 B1 | 3/2003 | Koza et al. | |
| 6,539,366 B1 | 3/2003 | Doyle et al. | |
| 6,553,357 B2 | 4/2003 | Mathias et al. | |
| 6,691,285 B1 | 2/2004 | Burden et al. | |
| 6,725,326 B1 | 4/2004 | Patra et al. | |
| 6,882,989 B2 | 4/2005 | Stevens | |
| 7,031,887 B2 | 4/2006 | Jain et al. | |
| 7,037,735 B2 | 5/2006 | Noguchi et al. | |
| 7,043,463 B2 | 5/2006 | Bonabeau et al. | |
| 7,045,674 B2 | 5/2006 | Davisson | |
| 7,098,055 B2 | 8/2006 | Noguchi et al. | |
| 7,191,168 B1 | 3/2007 | Buchsbaum et al. | |
| 7,313,666 B1 | 12/2007 | De Silva et al. | |
| 7,383,235 B1 | 6/2008 | Ulyanov et al. | |
| 7,443,496 B2 | 10/2008 | Noguchi et al. | |
| 7,451,121 B2 | 11/2008 | Wu et al. | |
| 7,469,237 B2 | 12/2008 | Cooper | |
| 7,514,407 B2 | 4/2009 | Averback | |
| 7,560,248 B1 | 7/2009 | Raines | |
| 7,603,326 B2 | 10/2009 | Bonabeau et al. | |
| 7,616,763 B2 | 11/2009 | Le Buhan et al. | |
| 7,639,350 B2 | 12/2009 | Noguchi et al. | |
| 7,692,779 B2 | 4/2010 | Noguchi et al. | |
| 7,743,150 B1 | 6/2010 | Carter et al. | |
| 7,937,569 B1 | 5/2011 | Sander et al. | |
| 7,940,383 B2 | 5/2011 | Noguchi et al. | |
| 8,140,766 B2 | 3/2012 | Bell, Jr. et al. | |
| 8,312,455 B2 | 11/2012 | Bell, Jr. et al. | |
| 8,327,126 B2 | 12/2012 | Bell, Jr. et al. | |
| 8,352,712 B2 | 1/2013 | Bell, Jr. et al. | |
| 8,370,584 B2 | 2/2013 | Cantin et al. | |
| 8,379,847 B2 | 2/2013 | Bell, Jr. et al. | |
| 8,397,030 B2 | 3/2013 | Cantin et al. | |
| 8,489,526 B2 | 7/2013 | Cantin et al. | |
| 2002/0016782 A1 | 2/2002 | Cooper | |
| 2002/0019975 A1 | 2/2002 | Johnson | |
| 2002/0120407 A1 | 8/2002 | Stevens | |
| 2002/0183510 A1 | 12/2002 | Vail | |
| 2003/0028578 A1 | 2/2003 | Jain et al. | |
| 2003/0055614 A1 | 3/2003 | Pelikan et al. | |
| 2003/0126598 A1 | 7/2003 | Agnihotri et al. | |
| 2004/0002460 A1 | 1/2004 | Averback | |
| 2004/0008883 A1 | 1/2004 | Shi et al. | |
| 2004/0010479 A1 | 1/2004 | Ali | |
| 2004/0024750 A1 | 2/2004 | Ulyanov et al. | |
| 2004/0029809 A1 | 2/2004 | Averback | |
| 2004/0044633 A1 | 3/2004 | Chen | |
| 2004/0133929 A1 | 7/2004 | Davisson | |
| 2004/0210545 A1 | 10/2004 | Branke et al. | |
| 2004/0254901 A1 | 12/2004 | Bonabeau et al. | |
| 2005/0044052 A1 | 2/2005 | Zhu | |
| 2005/0159897 A1 | 7/2005 | Anderson et al. | |
| 2005/0197978 A1 | 9/2005 | Anderson et al. | |
| 2005/0197979 A1 | 9/2005 | Anderson et al. | |
| 2006/0195204 A1 | 8/2006 | Bonabeau et al. | |
| 2007/0116267 A1 | 5/2007 | Speirs et al. | |
| 2007/0172828 A1 | 7/2007 | Schaffer et al. | |
| 2008/0103995 A1 | 5/2008 | Mohamed et al. | |
| 2009/0150080 A1 | 6/2009 | Dawkins et al. | |
| 2009/0252718 A1 | 10/2009 | Jeyaseelan et al. | |
| 2009/0292180 A1 | 11/2009 | Mirow | |
| 2010/0113397 A1 | 5/2010 | Wong et al. | |
| 2010/0153299 A1 | 6/2010 | Keenan et al. | |
| 2012/0016826 A1 | 1/2012 | Behera et al. | |
| 2012/0123980 A1* | 5/2012 | Bhandari | G06N 3/12 706/13 |
| 2012/0130928 A1 | 5/2012 | Bell, Jr. et al. | |
| 2012/0130929 A1 | 5/2012 | Cantin | |
| 2013/0006901 A1 | 1/2013 | Cantin | |
| 2013/0006902 A1 | 1/2013 | Cantin | |
| 2013/0173511 A1 | 7/2013 | Cantin | |
| 2013/0173512 A1 | 7/2013 | Cantin | |
| 2013/0218789 A1 | 8/2013 | Guo | |
| 2013/0275351 A1 | 10/2013 | Cantin | |
| 2014/0344196 A1 | 11/2014 | Cantin | |
| 2014/0344199 A1 | 11/2014 | Cantin | |

FOREIGN PATENT DOCUMENTS

| | | |
|---|---|---|
| WO | 03074558 | 9/2003 |
| WO | 2004104029 | 12/2004 |
| WO | 2005078629 | 8/2005 |
| WO | 2006135345 | 12/2006 |
| WO | 2007123923 | 11/2007 |

OTHER PUBLICATIONS

"Crossover and Mutation", http://www.obitko.com/tutorials/genetic-algorithms/crossover-mutation.php Marek Obitko, 1998, 1 page.

"U.S. Appl. No. 12/948,850 Office Action", Nov. 16, 2012, 13 pages.

"U.S. Appl. No. 12/954,296 Restriction Requirement", Nov. 29, 2012, 6 pages.

Affenzeller, Michael et al., "Genetic Algorithms and Genetic Programming: Modern Concepts and Practical Applications", CRC Press, 2009 http://www.crcpress.com/product/isbn/9781584886297 Apr. 9, 2009, pp. 138-139.

Baluja, Shumeet, "Genetic Algorithms and Explicit Search Statistics", Justsystem Pittsburgh Research Center & School of Computer Science, Carnegie Mellon University 1997, 7 pages.

Bright, Marc et al., "An Efficient Random Number Generation Architecture for Hardware Parallel Genetic Algorithms", Lecture Notes in Computer Science; vol. 1917, pp. 583-588, Year of Publication: 2000 ISBN:3-540-41056-2 Publisher: Springer-Verlag 2000, pp. 583-588.

Colton, Simon, "Lecture 16 Genetic Algorithms", http://www.doc.ic.ac.uk/~sgc/teaching/v231/lecture16.html 2004, 8 pages.

Dubrovsky, Opher et al., "A Genetic Algorithm with a Compact Solution Encoding for the Container Ship Stowage Problem", Journal of Heuristics, vol. 8, Issue 6 (Nov. 2002) pp. 585-599 Year of Publication: 2002, ISSN:1381-1231 http://portal.acm.org/citation.cfm?id=594958.595104&coll=GUIDE&dl=GUIDE&CFID=91858704&CFTOKEN=76504727 Nov. 2002, pp. 585-599.

Ergezer, Mehmet et al., "Oppositional Biogeography-Based Optimization", IEEE publication m.ergezer@ csuohio.edu 2009, pp. 1009-1014.

Greenwell, R.N. et al., "Optimal Mutation Probability for Genetic Algorithms", Mathematical and Computer Modelling vol. 21, No. 8, Apr. 1995, pp. 1-11(11) http://www.ingentaconnect.com/content/els/08957177/1995/00000021/00000008/art00035 Apr. 1995, pp. 1-11.

Nowostawski, Mariusz et al., "Dynamic Demes Parallel Genetic Algorithm", May 13, 1999, 6 pages.

Pal, Sankar K. et al., "Genetic algorithms for pattern recognition", CRC Press, 1996, pp. 69-72 http://www.crcpress.com/product/isbn/9780849394676;jsessionid=RF4KzllhxMO3zF3u8Z8sRQ** 1996, p. 69.

Rahnamayan, et al., "Opposition-Based Differential Evolution (ODE) with Variable Jumping Rate", IEEE publication shahryar@pami.uwaterloo.ca, tizhoosh@uwaterloo.ca, m.salama@ece.uwaterloo.ca 2007, pp. 81-88.

Reeves, Colin, "Kluwewer's International Series—Handbook of Metaheuristics", WebSite Link: http://sci2s.ugr.es/docencia/

(56) References Cited

OTHER PUBLICATIONS algoritmica/GeneticAlgorithms.pdf Chapter 3, School of Mathematical and Information Sciences Coventry University, Priory St, Coventry CV1 5FB; E-mail: C. Reeves@conventry. ac.uk http://www.mis.coventry.ac.uk/~colinr/ 2003, 28 pages.

"Plug-and-Play Macroscopes", Communications of the ACM vol. 54, Issue No. 3 Mar. 2011, 116 pages.

"U.S. Appl. No. 13/174,441 Office Action", Jun. 5, 2013, 30 pages.

Alba, Enrique et al., "Influence of the Migration Policy in Parallel Distributed GAs with Structured and Panmictic Populations", Applied Intelligence vol. 12 Issue 3, May-Jun. 2000 May-Jun. 2000, 163-181.

Gong, Yiyuan et al., "Parallel Genetic Algorithms on Line Topology of Heterogeneous Computing Resources", GECCO '05 Proceedings of the 2005 conference on Genetic and evolutionary computation 2005, 1447-1454.

Jin, Yaochu et al., "Fitness A.pproxhnation in Evolutionary Computation—.A Survey", Proceedings of the Genetic and Evolutionary Computation Conference Email: yaochu.jin@de.hrdeu.com 2002, pp. 1105-1112.

Kargupta, Hillol, "Search, Polynomial Complexity, and the Fast Messy Genetic Algorithm", Illigal Report No. 95008 Oct. 1995, 202 pages.

Mitrevski, P. et al., "Prediction and Speculation Techniques in ILP", 22nd Int. Conf. Information Technology Interfaces ITI2000 pece. mitrevski@ukio.edu.mk; (marjan, infolab)@prof.ukim.edu.mk Jun. 2000, pp. 67-72.

Ochoa, Gabriela et al., "Optimal Mutation Rates and Selection Pressure in Genetic Algorithms", Proceedings of the Genetic and Evolutionary Computation Conference (GECCO '00) Jul. 8-12, 2000, 8 pages.

"Crossover and Mutation", http://www.obitko.com/tutorial/genetic-algorithms/crossover-mutation.php Marek Obitko, 1998 1998, 1 page.

"U.S. Appl. No. 13/916,301 Office Action", Jan. 15, 2014, 8 pages.

Bright, Marc et al., "An Efficient Random Number Generation Architecture for Hardware Parallel Genetic Algorithms", Lecture Notes in Computer Science; vol. 1917 pp. 583-588 Year of Publication: 2000 ISBN:3-540-41056-2 Publisher: Springer-Verlag 2000, pp. 583-588.

Dubrovsky, Opher et al., "A Genetic Algorithm with a Compact Solution Encoding for the Container Ship Stowage Problem", Journal of Heuristics, vol. 8, Issue 6 (Nov. 2002) pp. 585-599 Year of Publication: 2002 ISSN:1381-1231 http://portal.acm.org/citation.cfm?id=594958.595104&coll=GUIDE&dl=GUIDE&CFID=91858704&CFTOKEN=76504727 Nov. 2002, pp. 585-599.

Greenwell, R.N. et al., "Optimal Mutation Probability for Genetic Algorithms", Mathematical and Computer Modelling vol. 21, No. 8, Apr. 1995, pp. 1-11(11) http://www.ingentaconnect.com/content/els/08957177/1995100000021/000000081art00035 Apr. 1995, pp. 1-11.

Jin, Yaochu et al., "Fitness Approximation in Evolutionary Computation—A Survey", Proceedings of the Genetic and Evolutionary Computation Conference Email: yaochu.jin@de.hrdeu.com 2002, pp. 1105-1112.

Mitrevski, P. et al., "Prediction and Speculation Techniques in ILP", 22nd Int. Conf. Information Technology Interfaces ITI2000 pece. mitrevski@ukio.edu.mk; (marjan, infolab)@prof.ukim.edu.mk Jun. 2000, pp. 67-72.

"U.S. Appl. No. 13/897,584 Office Action", Jun. 22, 2015, 7 pages.

Sen, Ouyang, "An Improved Catastrophic Genetic Algorithm and Its Application in Reactive Power Optimization", http://www.SciRP.org/journal/epe Nov. 2010, pp. 306-312.

Vertanen, Keith, "Genetic Adventures in Parallel: Towards a Good Island Model under PVM", 1998, 12 pages.

Welten, Samuel, "Parallelization of Evolutionary Algorithms", Swiss Federal Institute of Technology Zurich, Systems Optimization Group—Thesis Spring 2008, pp. 1-51.

Xin-Rong, Liu et al., "Application of Catastrophic Adaptive Genetic Algorithm to Reactive Power Optimization of Power System", Artificial Intelligence and Computational Intelligence (AICI), 2010 International Conference Oct. 23-24, 2010, 2 pages.

Yu, Wen et al., "A Catastrophe Based-Parallel Genetic Algorithm", Systems Engineering Institute of Xi'an Jiaotong University, Xi'an710049) Jul. 2001, 4 pages.

\* cited by examiner

ADAPTIVE CATACLYSMS IN GENETIC ALGORITHMS

RELATED APPLICATIONS

This application is a continuation application that claims the benefit of U.S. patent application Ser. No. 13/897,584 filed May 20, 2013.

BACKGROUND

Embodiments of the inventive subject matter generally relate to the field of computing, and, more particularly, to metaheuristic optimization.

Software tools employ metaheuristic optimization algorithms to solve optimization problems. Examples of metaheuristic optimization algorithms include evolutionary algorithms (e.g., genetic algorithm, differential evolution), ant colony optimization algorithms, simulated annealing algorithms, etc.

Evolutionary algorithms use techniques loosely based on Darwinian evolution and biological mechanisms to evolve solutions to design problems. A software tool that implements an evolutionary algorithm starts with a randomly generated population of solutions, and iteratively uses recombination, crossover, mutation, and the Darwinian principles of natural selection to create new, more fit solutions in successive generations. Evolutionary algorithms have been deployed in many aspects of research and development, and have generated human-competitive solutions to a wide range of problems.

SUMMARY

Embodiments of the inventive subject matter generally include a method. The method includes determining that a population of candidate solutions for an optimization problem has prematurely converged during a metaheuristic optimization run. A cause for premature convergence of the population is determined based, at least in part, on an analysis of the metaheuristic optimization run. A first cataclysm strategy of a plurality of cataclysm strategies is selected based, at least in part, on one of the cause of the premature convergence and a history of the metaheuristic optimization run. A cataclysm is simulated based, at least in part, on the first cataclysm strategy.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
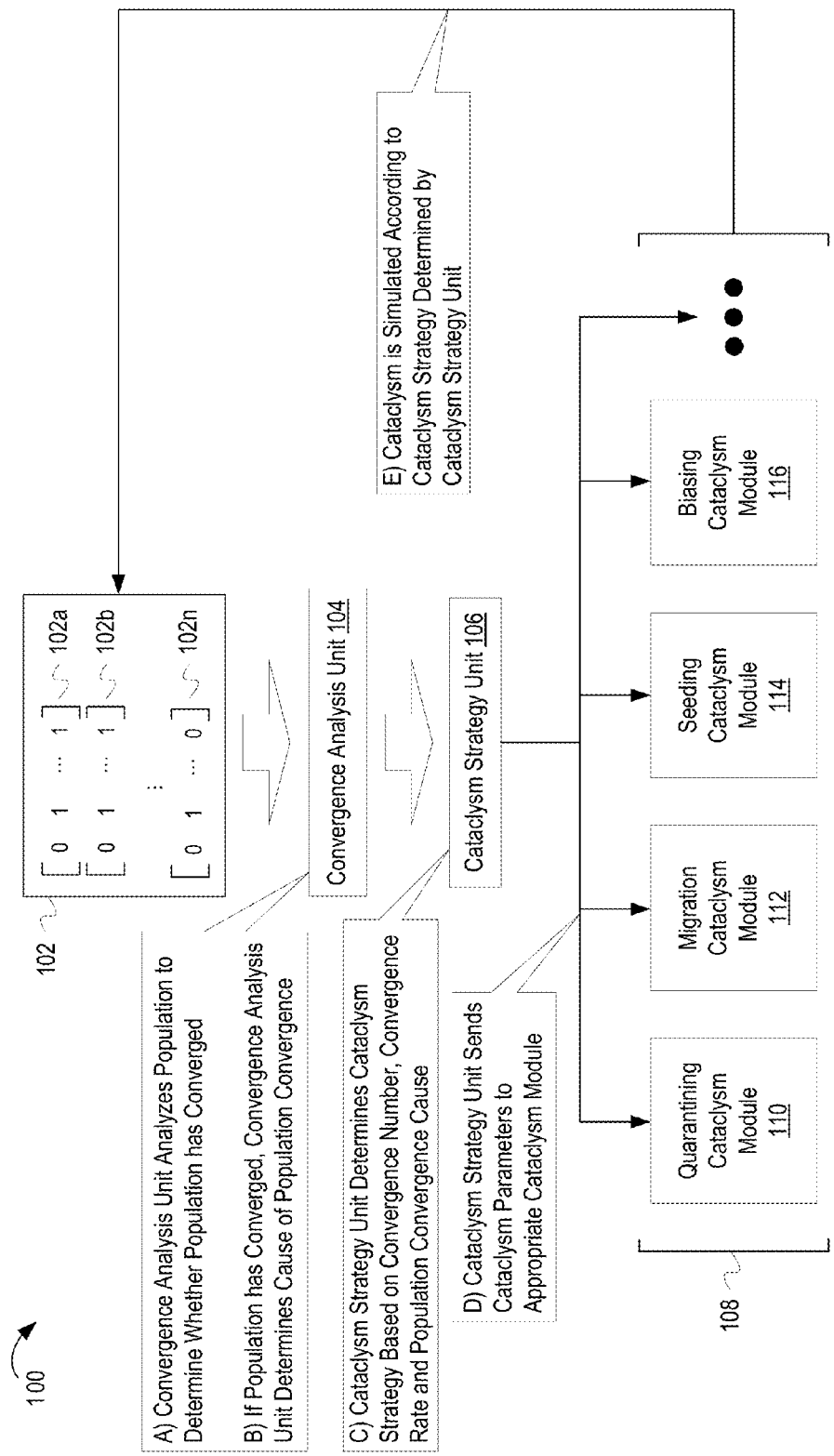
FIG. 1 depicts example operation of an adaptive cataclysm controller.

The description that follows includes exemplary systems, methods, techniques, instruction sequences and computer program products that embody techniques of the present inventive subject matter. However, it is understood that the described embodiments may be practiced without these specific details. For instance, although examples refer to genetic algorithm simulations, some embodiments may utilize other types of evolutionary algorithms (e.g., genetic programming, evolutionary programming, evolution strategy, etc.) suited to fit a particular type of problem being solved. Furthermore, some embodiments may also utilize additional forms of metaheuristic optimization strategies. In other instances, well-known instruction instances, protocols, structures and techniques have not been shown in detail in order not to obfuscate the description.

Terminology

Literature about evolutionary computing uses a large variety of terminology. In some cases, terms are used ambiguously. A "candidate solution" can be program code, a data structure of actual parameters (e.g., vector or array of actual parameters), or both. In this description, a candidate solution is referred to as an individual. Although some examples of the structure of an individual are provided, the examples are not intended to limit the structure to that described, but are merely provided to help describe the inventive subject matter. The inventive subject matter can be adapted to work with individuals of any underlying structure.

Genetic algorithm literature sometimes uses the terms "population" and "generation" ambiguously. A software tool or computer program that implements an evolutionary algorithm to solve an optimization problem iteratively creates individuals, computes fitness values for the individuals, and evaluates the individuals to determine whether a next iteration should begin. The individuals created at a particular iteration are referred to as a generation or a population.

Genetic algorithm literature sometimes uses the terms "mass extinction," "catastrophe," and "cataclysms" ambiguously. Other terms may also be used to describe the same concept. This description will use the term "cataclysm." A cataclysm occurs when a large portion of the population is not carried over from one generation to the next. A set of one or more individuals, called survivors, is carried over to the next generation and combined with a set of other individuals. The set of other individuals can be populated in various ways. However, the set of other individuals commonly consists of randomly generated individuals. Furthermore, while a catastrophe can include a plurality of survivors, this description will refer to a single survivor. However, the inventive subject matter is not limited to a single survivor. Furthermore, the survivor can be any individual from the previous generation, but is commonly the fittest individual. Although the description assumes that the survivor is the fittest individual from the previous generation, the inventive subject matter is not so limited.

An evolutionary simulation may operate on a single deme model or a multi-deme model. A deme refers to a local population unit. In a multi-deme model, a population of individuals is separated into sub-populations. Individuals do not mix between demes of sub-populations unless migration is implemented. When separated into sub-populations, the term "generation" typically refers to all of the sub-populations in that generation. The context of this discussion is, generally, a population within a single deme model or a sub-population within a multi-deme model. The term "population" will be used, and when referring to another sub-population within the multi-deme model, the term "foreign population" will be used.

In the descriptions herein, the use of a genetic algorithm to search for a solution to a problem is referred to as a "simulation" because the genetic algorithm is, to a certain degree, simulating the evolution of a population. The term "run" can also be used to describe the use of a genetic algorithm, or other metaheuristic optimization algorithm, to find solutions for a problem.

Overview

A genetic algorithm simulates the evolution of a population. Each individual within the population is a representation of a solution to a problem. Each individual includes a set of genes, where each gene, or a combination of genes, represents a particular aspect of the particular solution represented by the individual. To create the next generation of the population, the individuals are "bred." Breeding is simulated using operations that are similar to those found in biology, such as combining genes from two different individuals and randomly mutating genes. Each individual in a generation is tested for "fitness," i.e., which individuals (solutions) perform the best based on a set of criteria or thresholds. The fitter individuals are then given a better chance to breed. Thus, each generation, in theory, begets better solutions until an optimal solution is found.

However, in practice, populations can converge on one solution that is not the most optimal. These convergences are called "local optima." A convergence occurs when one particular set of genes performs well enough that the set of genes are replicated throughout the population. Continued breeding of the population may not produce fitter individuals due to the lack of genetic diversity among the individuals.

Cataclysms are used to overcome the convergence of a population. A cataclysm is a mass extinction event in which only a small portion of the population from a first generation is carried over to the next generation (the survivors), and the rest of the population is replaced with another set of individuals. In other words, a large portion of the population in the first generation is discarded (or becomes extinct). For example, a cataclysm can be implemented to carry the best performing individual, or survivor, over to the next generation, while replacing the rest of the population with individuals containing randomly selected/created sets of genes.

Implementing a cataclysm by carrying a survivor over to the next generation and replacing the rest of the population with random individuals can be viewed as a default strategy for spurring more progress. However, it can be the case that this strategy does not produce a fitter individual, whether after the first use or after repeated applications. This may be intuitive, as a survivor that has developed over many generations may be so much fitter than a set of randomized individuals that the survivor quickly overtakes the rest of the population.

However, various cataclysm strategies exist that can permit further progress. Additionally, the various cataclysm strategies can be adjusted, permitting each cataclysm strategy to be used for more cataclysms. Thus, an adaptive cataclysm controller can be designed to analyze a population and determine whether the population has converged, Further, the adaptive cataclysm controller can be designed to select a different cataclysm strategy or adjust the current cataclysm strategy to continue generating fitter individuals.

Adaptive Cataclysm Controller Illustrations

FIG. 1 depicts example operation of an adaptive cataclysm controller. FIG. 1 depicts an adaptive cataclysm controller 100 (hereinafter "cataclysm controller"), including a convergence analysis unit 104 and a cataclysm strategy unit 106. The cataclysm controller 100 also includes an example set of cataclysm modules, including a quarantining cataclysm module 110, a migration cataclysm module 112, a seeding cataclysm module 114 and a biasing cataclysm module 116.

Also depicted is a representative population 102, which can be represented by data that is accessible to the cataclysm controller 100. The population 102 contains a set of n individuals, represented by arrays 102a, 102b and 102n. Each array represents the genes of the individual. Each individual can also be associated with other metadata, such as an indication of the individual's fitness and tokens.

At stage A, the convergence analysis unit 104 analyzes the population 102 to determine whether the population 102 has converged. Population convergence can be defined in a variety of ways. However, the concept underlying determining population convergence is determining when the population 102 is in a state that makes it unlikely that subsequent populations will produce fitter individuals. In some implementations, it can be impossible to determine that a population will not, to a certainty, produce fitter individuals. For example, in some genetic algorithm implementations, it can be possible to reach a state where each individual in the population 102 has the exact same set of genes, thus preventing any further evolution of the population 102. However, some genetic algorithm implementations implement random genetic mutations or similar functionality. Random mutations create the possibility that a particular random mutation to an individual within a converged population will subsequently spawn better individuals. Thus, in some implementations, it is possible that a converged population will not remain converged. Thus, determining whether a population has converged or not means defining conditions in which the likelihood of further progress is low enough that additional manipulation of the simulation is more efficient.

Population convergence can thus be defined differently depending on the implementation, optimization problem, etc. For example, experience, testing, or intuition may lead to defining convergence as being when ninety-nine percent of the population 102 has the same genes. In some cases, convergence may be defined as when ninety percent of the population 102 has similar genes, where "similar genes" can also be variously defined. For example, determining that two individuals have "similar genes" may be based on a particular subset of genes that impact an individual's fitness instead of the entire set of genes. In other words, if an individual has a particular subset of genes, the rest of the individual's genes can be any combination without impacting the fitness of the individual. In such scenarios, convergence might be defined as when ninety percent of the population 102 has the particular subset of genes that impacts the individual's fitness. Thus, the definition of a population convergence can be a configurable value, set of values or an otherwise variable definition. The definition can change between implementations, based on the underlying problem or even between different simulations of the same problem.

At stage B, the convergence analysis unit 104 determines why the population 102 converged if, at stage A, the convergence analysis unit 104 determines that the population 102 meets the definition of converged. Generally, the reason why the population 102 converged is most important when external manipulation may have impacted the convergence. In other words, in some implementations, if the initial population was randomly generated, and no external manipulation was involved (as discussed below), the convergence analysis unit 104 may skip stage B for the initial population convergence.

The ultimate goal of a simulation using a genetic algorithm is to have the population 102 converge to the optimum solution for a problem. However, it is generally never known whether the population 102 has converged to the optimum solution or merely converged to a local optimum. Thus, the goal of a simulation using a genetic algorithm, in practice, is to have each convergence result in a fitter individual than the previous convergence. By determining what caused a particular convergence, techniques can be applied to mitigate the causes leading to a convergence.

One technique the convergence analysis unit 104 can use to determine why the population 102 converged is the use of tokens. A token is similar to a gene, but is not contained in an individual's set of genes. It is an example of additional metadata that can be associated with an individual, as described above. A token serves as a marker, similar to a gene, but is not subject to random mutation, and can have specific rules defined to govern inheritance.

To assist in determining the cause of a population convergence, a token can be associated with an individual or set of individuals. For example, a token can be associated with a survivor. Any offspring of an individual that is associated with a token also becomes associated with the token. Thus, the token indicates all descendants from the individual(s) that was/were originally associated with the token. During the analysis, if the convergence analysis unit 104 determines that a large portion of the population 102 has the token associated with the survivor, the convergence analysis unit 104 has determined that the survivor took over the rest of the population 102.

The cause of a population convergence can be determined without tokens as well. For example, the convergence analysis unit 104 can analyze the simulation history to determine the cause of the convergence. The convergence analysis unit 104 can determine that a survivor overtook the rest of the population 102 by comparing the genes of the survivor with those of the individuals in the converged population. If the genes of the converged population are similar enough to the survivor, the convergence analysis unit 104 can determine that the survivor took over the population 102. Additional analysis, such as analyzing the individual generations can also be used to assist in determining the cause behind a convergence of the population 102.

At stage C, the cataclysm strategy unit 106 determines the cataclysm strategy based on the number of times the population 102 has converged (hereinafter "convergence count"), convergence rate and cause of the population convergence.

At the most basic, knowing the convergence count allows the cataclysm strategy unit 106 to determine whether or not the current convergence of the population 102 is the first convergence or not. When the population 102 converges for the first time, the cataclysm strategy unit 106 selects a default cataclysm strategy. The cataclysm strategy selected as the default strategy can vary between simulations, either being selected by a user or chosen dynamically based on information supplied by the convergence analysis unit 104 or other components.

The convergence count is also useful to determine whether the application should switch to another cataclysm strategy or not. For example, the convergence count can be reset whenever the cataclysm strategy is changed, or a second convergence count used to count the number of convergences since the last cataclysm strategy change. Regardless of the particular implementation, tracking the convergence count allows the cataclysm strategy unit 106 to determine whether to adjust the current cataclysm strategy or switch to another cataclysm strategy. For example, if the convergence rate is high, as discussed below, the cataclysm strategy unit 106 may determine that a change needs to be made to the cataclysm strategy in order to continue making progress. However, if the current cataclysm strategy has only been selected for a few cataclysms, the cataclysm strategy unit 106 may determine that the parameters of the current cataclysm strategy should merely be adjusted, as opposed to changing to a completely different cataclysm strategy.

The cataclysm strategy unit 106 can use the convergence rate to determine whether the cataclysm strategy should be changed. The convergence rate, for the purposes of this discussion, is defined as the number of generations prior to the population 102 converging. However, it can be defined in different ways. For example, if convergence is defined as occurring when five generations have passed in which no progress has been made, the convergence rate can be defined as either the number of generations before the definition of convergence was met or the number of generations before the progress stalled.

A pattern that can emerge upon repeating a cataclysm strategy is that each subsequent convergence occurs after fewer generations. For example, after an initial cataclysm, the simulation may run for twenty generations before converging; after a second cataclysm, the simulation may run for ten generations before converging; after a third cataclysm, the simulation may run for five generations before converging, etc. The goal of the cataclysm strategy unit 106 is to use information from the convergence analysis unit 104 and/or other components to modify the cataclysm strategy to allow the simulation to progress further between convergences.

In some scenarios, the cataclysm strategy unit 106 adjusts the current cataclysm strategy in an attempt to prolong the progress. For example, if the current cataclysm strategy has only been selected for a small number of cataclysms, the simulation may miss progress by prematurely changing to a new cataclysm strategy. However, in some scenarios, the cataclysm strategy unit 106 does change the cataclysm strategy entirely. For example, if the current cataclysm strategy has progressed through several adjustments, the cataclysm strategy unit 106 may determine that changing to a new cataclysm strategy will provide greater progress than continued updates to the current strategy.

One cataclysm strategy that can be selected by the cataclysm strategy unit 106 is referred to as "quarantining." Instead of generating a new population of random individuals, and inserting a survivor into the new population, the survivor is "quarantined" for a number of generations. After the number of quarantine generations has passed, the survivor is inserted into the population 102. By quarantining the survivor, the new, randomly generated population has the opportunity to evolve and generate stronger individuals. Thus, instead of the survivor rapidly taking over the rest of the population 102, the population 102 has a greater opportunity to produce stronger individuals that are more capable of competing with the survivor. The greater the competition between the individuals of the population 102, the more likely a better individual will be produced.

One adjustment that can be made to the quarantining cataclysm strategy is to the number of generations with which to quarantine the survivor (hereinafter "quarantine period"). Generally, the default quarantine period begins as fewer generations and increases as determined by the cataclysm strategy unit 106. However, implementations can vary. For example, the quarantine period can be adjusted up or down, as determined by the cataclysm strategy unit 106.

Furthermore, the default quarantine period can be different between implementations, and can even be adjusted by the cataclysm strategy unit 106.

Each time the cataclysm strategy unit 106 determines that the quarantining cataclysm strategy should be updated, the cataclysm strategy unit 106 can increase the quarantining period by a certain amount. Additionally, the quarantining period can increase in a non-linear fashion, such as increasing the quarantining period by an amount greater than the previous increase. The cataclysm strategy unit 106 can utilize other techniques as well. For example, the cataclysm strategy unit 106 can use the history of previous adjustments to determine the next number of generations to increase the quarantining by. For example, if an increase to the quarantine period of two generations yields ten generations of progress, the next increase to the quarantine period may be only three generations. However, if an increase to the quarantine period of two generations yielded three generations of progress, the next increase to the quarantine period may be five generations. Additionally, the cataclysm strategy unit 106 can use a quarantine period based on a particular level of fitness. For example, the cataclysm strategy unit 106 can designate that the quarantine should continue until the average fitness of the population 102 is eighty percent of the fitness of the survivor.

A second cataclysm strategy that can be selected by the cataclysm strategy unit 106 is utilizing "migration" after a cataclysm event. Migration is possible when the population 102 is part of a multi-deme simulation. Migration is simulated by moving one or more individuals from another population (hereinafter "foreign population") into the "local" population 102. Generally, the cataclysm occurs as before, without quarantining. Thus, the survivor is added to a new population of randomly generated individuals. Additionally, the fittest individual from a foreign population is moved or cloned into the population 102. Thus, the survivor and the fittest foreign individual are allowed to compete against each other. Although the fittest individual from a foreign population is often used, any individual from the foreign population can be used.

The cataclysm strategy unit 106 can make adjustments to the migration strategy by applying the quarantining strategy to the survivor and/or delaying the migration of the foreign individual. A hypothetical can be used to demonstrate the adjustments as well as further describe use of tokens.

Assume that, when the migration strategy is selected by the cataclysm strategy unit 106, the first generation after the cataclysm includes a set of randomly generated individuals, the survivor, and a foreign individual. The survivor has a token indicating it as such and the foreign individual has a token indicating it as being from a foreign population. When a reproduction operation is performed, each parent is checked for a token, which is then passed on to the offspring. When only one parent individual has a token or both parents have the same token, the token is inherited by the child. When both parents have different tokens, the token of the fittest parent is inherited by the child, but not both.

After the population 102 converges, the convergence analysis unit 104 can use the tokens to determine whether the population 102 converged because of the survivor, the foreign individual, or a combination thereof. If the convergence analysis unit 104 determines that the population 102 converged because the survivor took over the population 102, the cataclysm strategy unit 106 can quarantine the survivor. If the convergence analysis unit 104 determines that the population 102 converged because the foreign individual took over the population 102, the cataclysm strategy unit 106 can delay the migration of the foreign individual. If the convergence analysis unit 104 determines that the population 102 converged because of a combination of the survivor and the foreign individual, the cataclysm strategy unit 106 can quarantine the survivor, delay the migration of the foreign individual, or both, thus allowing the randomly generated population to evolve alone.

The same adjustments and variations available for the quarantining cataclysm strategy can be applied to both the quarantining of the survivor and delaying the migration of the foreign individual. Other variations are available to the migration cataclysm strategy as well. For example, the cataclysm strategy unit 106 can switch which population it moves or copies the foreign individual from. The cataclysm strategy unit 106 can also either reuse the original foreign individual for each cataclysm or, if the foreign population is simulated concurrently with the population 102, use the current fittest individual from the foreign population.

A third cataclysm strategy that can be selected by the cataclysm strategy unit 106 is utilizing "seeding" after a cataclysm event. Seeding is a technique in which one or more individuals (hereinafter "seeds") are specifically selected for inclusion in the population 102. Some seeds can include non-random genes, some seeds can be specific individuals selected from a population, whether randomly generated or after some evolution has taken place. A user typically has some knowledge of what traits, or combination of traits, will provide a fitter individual than an average randomly generated individual. Although seeding can be utilized at any time in a simulation, if the average fitness of the population 102 is low when a seed is added, the seed may be more likely to take over the population 102. This can lead to premature convergence. However, seeding can provide a strong individual for a survivor to compete against. Additionally, seeding can provide additional, targeted genetic diversity. For example, the user may be able to identify that a specific set of genes causes the population 102 to converge to a particular local optimum. The user can then seed the population 102 with an individual containing a set of genes that tend to converge to a different local optimum, in hopes that the resulting generations will produce an individual that converges to a better local optimum than the seed or the survivor.

The cataclysm controller 100 is not limited to user input for generating and inserting seeds. The convergence analysis unit 104 and cataclysm strategy unit 106 can produce, or help produce, a seed. For example, convergence analysis unit 104 can analyze the genes of all individuals in the population 102. In some scenarios, the convergence analysis unit 104 can determine that while some genes vary between individuals in the population 102, one or more sets of genes do not vary between individuals. Based on said determination, the convergence analysis unit 104 can determine that the genes that do not vary between the individuals control the convergence to the local optimum. The convergence analysis unit 104 can additionally use patterns in the evolution of the population 102 to determine similar connections. The cataclysm strategy unit 106 then uses the information from the convergence analysis unit 104 and generates an appropriate seed with a different set of genes. Additionally, a database of specific gene sequences that lead to local optimums can be maintained, allowing the cataclysm strategy unit 106 to select from a variety of possible seeds.

The above discussion illustrates that one adjustment the cataclysm strategy unit 106 can make to the seeding cataclysm strategy is changing the seed, or set of seeds, used.

Quarantining can also be applied to the survivor or the seed. Further, when utilizing multiple seeds, seeds or sets of seeds can be inserted into the population 102 in multiple generations. For example, if four seeds are being used, one seed can be inserted into the population 102 in the first generation after the cataclysm; two seeds can be inserted into the population 102 in the fourth generation after the cataclysm; and one seed can be inserted into the population 102 in the sixth generation after the cataclysm.

A fourth cataclysm strategy that can be selected by the cataclysm strategy unit 106 employs "biasing." Biasing involves biasing the probability that a randomly generated individual will have a particular gene. In other words, in scenarios where genes are represented by binary values (thus, an individual either has a gene or does not have a gene), each gene has a fifty percent chance of being randomly given to an individual. Thus, on average, half of the population 102 will have any one gene. However, the probability that an individual will have a particular gene can be adjusted, or biased. For example, a particular gene can be given a bias of seventy percent, thus resulting in any randomly generated individual having a seventy percent chance of having the gene. A seventy percent bias results in seventy percent of the population 102 having the particular gene, on average. In scenarios where genes are represented by non-binary values, additional methods can be employed. For example, if a gene is represented by a set of values (such as the characters 'a', 'b' and 'c'), each possible value can be given a particular bias value such that the sum of bias values for each gene is one. If a gene is represented by a particular range of values, bias values can be determined such that a value representing a gene is more likely to be within a particular sub-range. For example, biasing values can be applied such that the values representing a particular gene throughout the population 102 conform to a normal distribution around a particular mean value.

As with the prior strategies, a survivor is carried over to the post-cataclysm generation. The randomly generated portion of the population 102 is also generated, but with biasing applied to the generation. If genes are represented as an array of binary values, the bias values can be represented by an array with an entry that corresponds to each gene. The bias value in the entry can be represented by a decimal value between zero and one, where zero represents a zero percent chance of an individual having the corresponding gene and a one representing a one hundred percent chance of an individual having the corresponding gene.

The determination of the bias values can vary between implementations. As described above, seeds can be generated based on an analysis of the genes associated with a survivor. The bias values can be determined similarly. For example, if a particular set of genes are identified as relevant to the success of the survivor, the bias values can be set such that the randomly generated individuals have a lower probability of having those genes. Similarly, if a different set of genes is identified as performing similarly, or identified as converging onto a different local optimum, the bias values can be set such that the randomly generated individuals have a higher probability of having those genes.

The cataclysm strategy unit 106 can adjust the biasing cataclysm strategy in a variety of ways. For example, the cataclysm strategy unit 106 can adjust the amount of biasing. If the cataclysm strategy unit 106 is biasing away from a set of particular genes, the cataclysm strategy unit 106 can set the bias values associated with the set of genes to zero (or one, if biasing away from the lack of a particular gene). On the other hand, the cataclysm strategy unit 106 can also use more moderate bias values, such as 0.15, thus still allowing some individuals to have the set of genes. The cataclysm strategy unit 106 can also adjust the bias values based on a different goal. For example, if the cataclysm strategy unit 106 is using bias values to bias away from a particular gene combination, the cataclysm strategy unit 106 can change the bias values to bias towards a different gene combination.

At stage D, the cataclysm strategy unit 106 sends the cataclysm parameters to the appropriate cataclysm module. If the seeding cataclysm strategy was selected at stage C, for example, the cataclysm strategy unit 106 sends a notification to the seeding cataclysm module 114. Included in the notification are any parameters indicating what adjustments to the base seeding cataclysm strategy are to be made. For example, the cataclysm strategy unit 106 can indicate that the seeding cataclysm module 114 is to seed the first, third and fifth generation with three different seeds, also indicating the particular set of genes the seeds will have. The cataclysm strategy unit 106 can indicate that the cataclysm module use the default strategy for the particular module by not sending any parameters.

Additional data can be sent to the cataclysm module, depending on the implementation. For example, the data representing the population 102 can be sent to the cataclysm module in some implementations. In some implementations, the cataclysm module reads the data representing the population 102 in response to a notification from the cataclysm strategy unit 106. In some implementations, the cataclysm strategy unit 106 sends, or returns the data to the cataclysm controller 100, which then provides the data to the appropriate cataclysm module.

At stage E, the cataclysm is simulated according to the cataclysm strategy determined by the cataclysm strategy unit 106. The cataclysm, in which a new population is created and/or populated, can be simulated by different components depending on the implementation. For example, in some implementations, the cataclysm module corresponding to the selected cataclysm strategy receives or reads the data representing the population 102, simulates the cataclysm and then outputs the data representing the new population. In some implementations, the cataclysm controller 100 already includes the data representing the population 102 and simulates the cataclysm, replacing the data representing the previous population with data representing the population 102 after the cataclysm. After simulating the cataclysm, the cataclysm controller 100 continues the simulation, which may include repeating the above described stages.

Figure 2:
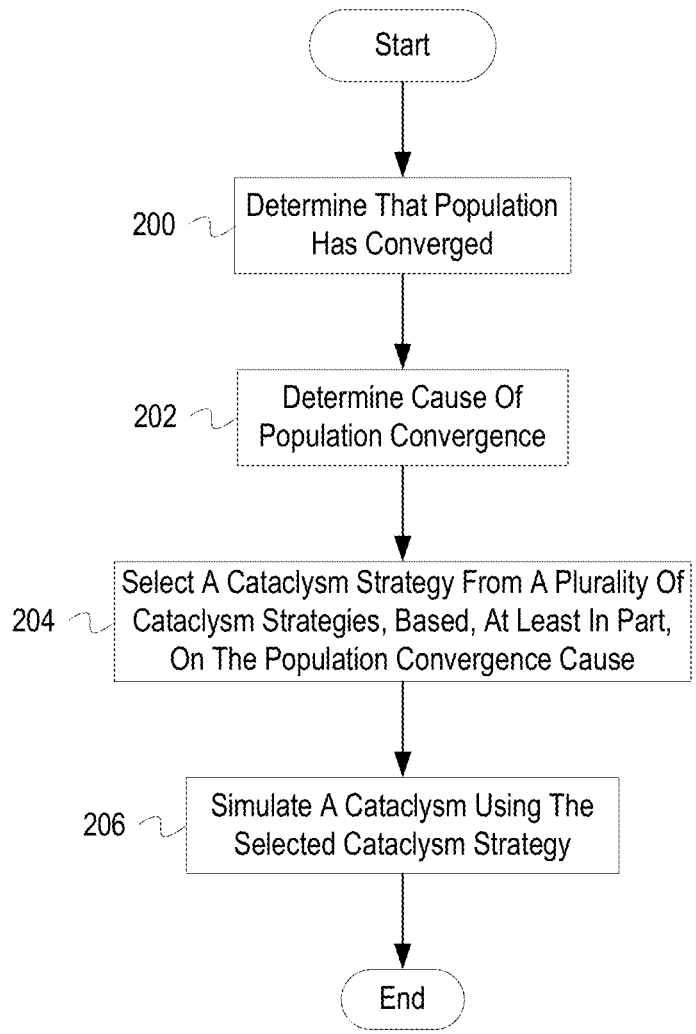
FIG. 2 depicts a flowchart of example operations for implementing a cataclysm controller.

FIG. 2 depicts a flowchart of example operations for implementing a cataclysm controller.

At block 200, the cataclysm controller determines that a population has converged. The individuals generated by breeding the individuals of the previous generation are tested using a fitness function to determine how each individual performs on the underlying problem. The cataclysm controller then analyzes the individuals to determine whether the population has converged or not. "Convergence" can be defined variously, as described above. In some implementations, the cataclysm controller does not analyze the population for convergence after each generation. Instead, the cataclysm controller compares the current generation with one or more generations to determine the amount of progress made between generations. For example, the cataclysm controller can compare the fitness of the best performing individual from both generations or compare the average fitness level of the individuals in both generations. The cataclysm controller then chooses to analyze the entire population for convergence depending on the amount of progress made between generations. Further, the cataclysm controller can compare the current generation with multiple prior generations. Comparisons of other aspects between generations can also be used. Utilizing values that were previously calculated or can be quickly calculated can increase the efficiency of the cataclysm controller compared with analyzing the entire population. After determining that the population has converged, control then flows to block 202.

At block 202, the cataclysm controller determines the cause of the population convergence. As described above, the cataclysm controller can analyze the genes within each individual as well as data from previous generations to determine the cause of the population convergence. Additionally, tokens can be utilized to help determine the cause of the convergence. After determining the cause of the population convergence, control then flows to block 204.

At block 204, the cataclysm controller selects a cataclysm strategy from a plurality of cataclysm strategies based, at least in part, on the population convergence cause. For example, if the population convergence is caused by a foreign individual taking over the population, the cataclysm can select a different cataclysm strategy that does not use migration. Further, if the simulation still progressed after the previous cataclysm, the cataclysm controller can select the same strategy used previously. The convergence rate, as discussed above, can indicate whether the simulation has progressed after the previous cataclysm. After selecting a cataclysm strategy, control then flows to block 206.

At block 206, the cataclysm controller simulates a cataclysm using the cataclysm strategy selected at block 204. For example, if the quarantining cataclysm strategy was selected, the cataclysm controller quarantines the survivor; if the migration cataclysm strategy was selected, the cataclysm controller inserts a foreign individual into the population, etc. After simulating the cataclysm, the process ends.

Figure 3:
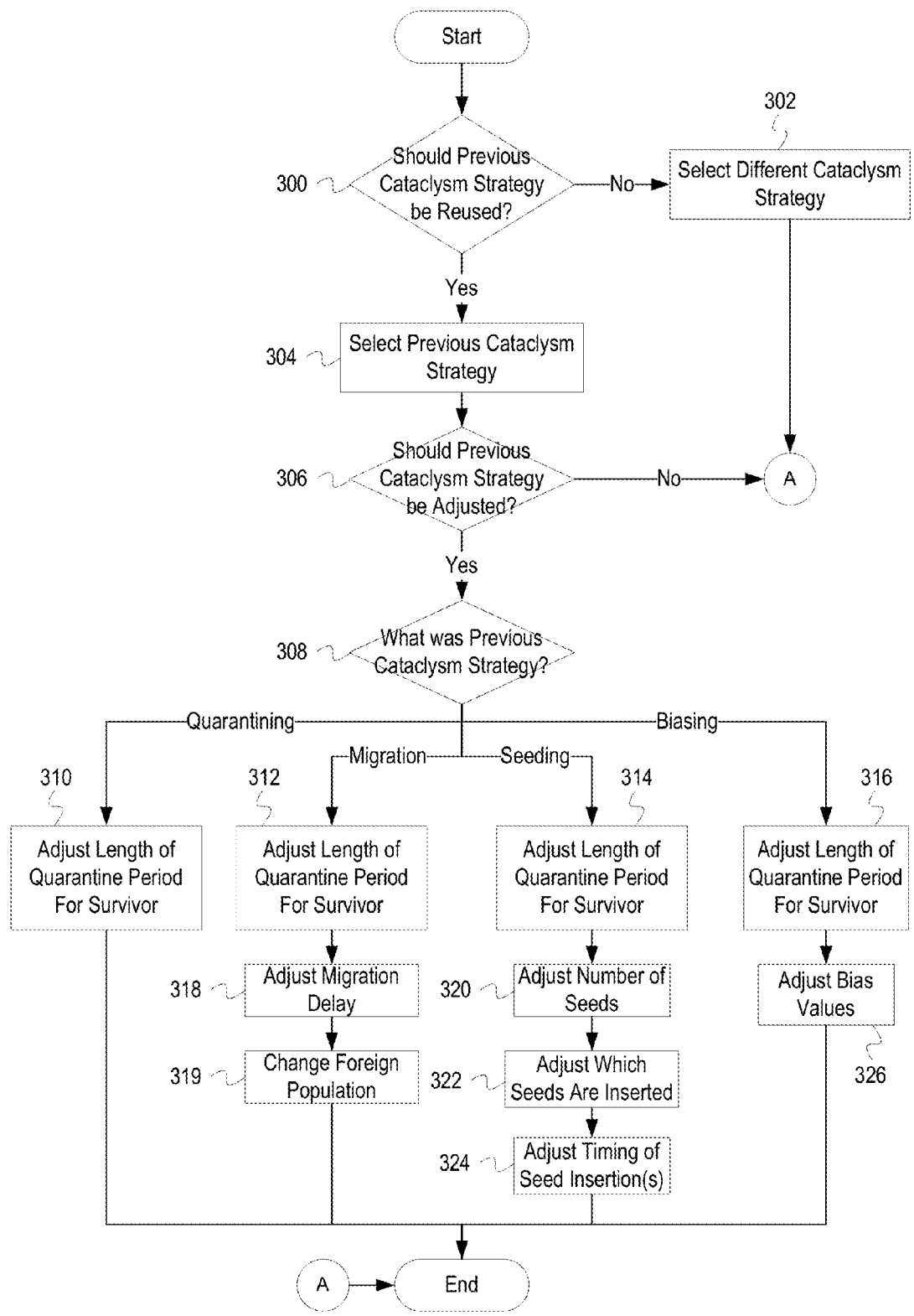
FIG. 3 depicts a flowchart of example operations for selecting one of a plurality of cataclysm strategies and configuring the selected strategy based, at least in part, on the population convergence cause and simulation history.

FIG. 3 depicts a flowchart of example operations for selecting one of a plurality of cataclysm strategies and configuring the selected strategy based, at least in part, on the population convergence cause and simulation history.

At block 300, the cataclysm controller determines if the previous cataclysm strategy should be reused. The previous cataclysm strategy was the cataclysm strategy used on the most recent cataclysm. The cataclysm controller uses various criteria to determine whether the previous cataclysm strategy should be reused. For example, the cataclysm controller can analyze the amount of progress made after using the previous cataclysm strategy. If the progress made is over a certain threshold, the cataclysm controller can choose to reuse the previous cataclysm strategy. If the progress made is not over the threshold, the cataclysm controller can choose not to reuse the previous cataclysm strategy. Further, the cataclysm controller can analyze the progress made over multiple uses of the previous cataclysm strategy. The cataclysm controller can also use the cause of the population convergence to determine whether the previous cataclysm strategy should be reused, as described above. If the cataclysm controller determines that the previous cataclysm strategy should be reused, control then flows to block 304. If the cataclysm controller determines that the previous cataclysm strategy should not be reused, control then flows to block 302.

At block 302, the cataclysm controller selects a cataclysm strategy that differs from the previous cataclysm strategy. In some implementations, the cataclysm controller selects a cataclysm strategy based on a predetermined order. For example, the cataclysm controller might always select the migrating strategy if the quarantining strategy was the previous cataclysm strategy. In some implementations, the cataclysm controller selects the cataclysm dynamically, based on an analysis of the population or analysis of other data. For example, certain classes of problems and solutions, when simulated, might see more progress when the cataclysm strategies are applied in a particular order. The cataclysm controller can read metadata about the simulation (such as the class of problems the current problem belongs to) and select the next cataclysm strategy based on said metadata. After selecting a different cataclysm strategy, the process ends.

Control flowed to block 304 if the cataclysm controller determined, at block 300, that the previous cataclysm strategy should be reused. At block 304, the cataclysm controller selects the previous cataclysm strategy. An indication of the previous cataclysm strategy can be stored in a variety of ways, such as in a variable, as a pointer to a cataclysm strategy module, a memory location such as register, etc. In some implementations, the previous cataclysm strategy remains selected until explicitly deselected or replaced by another cataclysm strategy. In other words, the cataclysm controller selects the previous cataclysm strategy implicitly by not selecting a different cataclysm strategy. After selecting the previous cataclysm strategy, control then flows to block 306.

At block 306, the cataclysm controller determines whether the previous cataclysm strategy should be adjusted. Similar to determining whether the previous cataclysm strategy should be reused, the cataclysm controller uses various criteria to determine whether the previous cataclysm strategy should be adjusted. For example, the cataclysm can look at the progress resulting from a previous adjustment to the previous cataclysm strategy, which can be indicated by the convergence rate. Some cataclysm strategies may be implemented such that they have a finite number of possible adjustments. Thus, in scenarios where no more adjustments to the cataclysm strategy are possible, the previous cataclysm strategy can be reused regardless of whether adjustments would otherwise have been made. If the cataclysm controller determines that the previous cataclysm strategy should be adjusted, control then flows to block 308. If the cataclysm controller determines that the previous cataclysm strategy should not be adjusted, the process ends.

At block 308, the cataclysm controller determines what the previous cataclysm strategy was. The cataclysm controller can determine this in a variety of ways, depending on the implementation. For example, the cataclysm controller can compare the value of a variable representing the previously used cataclysm strategy to a set of values representing each of the possible cataclysm strategies. Determining what the previous cataclysm was allows the cataclysm controller to make adjustments specific to a particular cataclysm strategy. If the previous cataclysm strategy was a quarantining cataclysm strategy, control then flows to block 310. If the previous cataclysm strategy was a migrating cataclysm strategy, control then flows to block 312. If the previous cataclysm strategy was a seeding cataclysm strategy, control then flows to block 314. If the previous cataclysm strategy was a biasing cataclysm strategy, control then flows to block 316.

At block 310, the cataclysm controller adjusts the length of the quarantine period for the survivor. In some implementations, the cataclysm controller adjusts the length of the quarantine period for the survivor based on a predetermined pattern. For example, the cataclysm controller may increase the quarantine period by two generations for each adjustment. In some implementations, the quarantine period can be adjusted dynamically. For example, the cataclysm controller may reduce the number of generations the quarantine period is increased if the progress after the previous adjustment was over a certain threshold, or vice versa. Adjustments are not limited to increasing the quarantine period, but can include decreasing the quarantine period as well. Adjustments to a quarantine period based off of a fitness level can be made in a similar manner. After adjusting the length of the quarantine period, the process ends.

Control flowed to block 312 if the cataclysm controller determined, at block 308, that the previous cataclysm strategy was the migrating cataclysm strategy. At block 312, the cataclysm controller adjusts the length of the quarantine period for the survivor. The cataclysm controller adjusts the length of the quarantine period in a manner that is substantially similar to adjusting the length of the quarantine period at block 310. After adjusting the length of the quarantine period, control then flows to block 318.

At block 318, the cataclysm controller adjusts the migration delay. The migration delay specifies how many generations after a cataclysm a foreign individual should be inserted into the population. The migration delay can be implemented by selecting a foreign individual when the cataclysm is performed, then quarantining the foreign individual for the number of generations specified by the migration delay. The migration delay can also be implemented by not selecting a foreign individual until after the number of generations specified by the migration delay. The migration delay is not limited to being defined as a specific number of generations, but can be defined based on other criteria, such as a fitness level. After adjusting the migration delay, control then flows to block 319.

At block 319, the cataclysm controller selects a different source foreign population from which the foreign individual is selected from. When multiple populations are simulated, each one may converge on different local optima. Thus, combining strong individuals from different populations can yield individuals that are fitter than either. However, migrating an individual from a particular foreign population may not result in fitter individuals. Thus, the cataclysm controller can change which population a foreign individual is selected from. The cataclysm controller can compare the fitness of the various foreign populations and select a foreign individual from a foreign population that has similar fitness to the population. After changing the foreign population from which the foreign individual is selected, the process ends.

Control flowed to block 314 if the cataclysm controller determined, at block 308, that the previous cataclysm strategy was the seeding cataclysm strategy. At block 314, the cataclysm controller adjusts the length of the quarantine period for the survivor. The cataclysm controller adjusts the length of the quarantine period in a manner that is substantially similar to adjusting the length of the quarantining period at block 310. After adjusting the length of the quarantine period, control then flows to block 320.

At block 320, the cataclysm controller adjusts the number of seeds inserted into the population. For example, if the cataclysm controller previously inserted one seed into the population, the cataclysm controller can insert two seeds into the population. Similarly, the cataclysm can decrease the number of seeds inserted into the population. If the number of seeds inserted into the population is increased, the additional seeds can be a copy of one or more of the other seeds, or seeds with genes that are distinct from the other seeds. After adjusting the number of seeds inserted into the population, control then flows to block 322.

At block 322, the cataclysm controller changes which seeds are inserted into the population. For example, if the cataclysm controller has a plurality of seeds from which to choose and is inserting fewer than all of the seeds, the cataclysm controller can replace a seed that was inserted the previous time with a different seed. A replacement seed can be a copy of another seed that is currently being inserted into the population. If the cataclysm controller determines that an additional seed should be inserted or a previously inserted seed not inserted, the number of seeds is also updated accordingly. After adjusting which seeds are inserted into the population, control then flows to block 324.

At block 324, the cataclysm controller adjusts the timing of the seed insertion(s). For example, if the cataclysm controller is inserting one seed into the population during the first generation after the cataclysm, the cataclysm controller can insert the seed into the third generation after the cataclysm instead. Similarly, if the cataclysm is inserting multiple seeds into the population, the cataclysm controller can adjust the timing of each seed insertion. For example, all seeds can be inserted during the first generation, inserted at evenly spaced intervals, inserted at random intervals, etc. After adjusting the timing of the seed insertion(s), the process ends.

Control flowed to block 316 if the cataclysm controller determined, at block 308, that the previous cataclysm strategy was the biasing cataclysm strategy. At block 316, the cataclysm controller adjusts the length of the quarantine period for the survivor. The cataclysm controller adjusts the length of the quarantine period in a manner that is substantially similar to adjusting the length of the quarantining period at block 310. After adjusting the length of the quarantine period, control then flows to block 326.

At block 326, the cataclysm controller adjusts the bias values. As described above, the bias values represent the probability that an individual will have a particular gene or have a particular value for the gene if non-binary. To adjust the bias values for binary genes, the cataclysm controller modifies the bias value associated with a particular gene, setting the bias value to another value between zero and one. To adjust the bias values for non-binary genes, the cataclysm controller modifies the bias values associated with a particular gene or otherwise adjusts the technique used to generate the gene value. Also as described above, the bias values can be adjusted in many ways. For example, the cataclysm controller can adjust the bias value associated with a single gene to one if the cataclysm controller determines that all randomly generated individuals should have that particular gene. Similarly, the cataclysm controller can adjust the bias value associated with a single gene to zero if the cataclysm controller determines that all randomly generated individuals should not have that particular gene. The cataclysm controller can adjust the bias value associated with a single gene to a value between zero and one if the cataclysm controller determines that a certain percentage of randomly generated individuals should have that particular gene. Similar variations can be accomplished when a gene is non-binary by adjusting a set of bias values accordingly, modifying the parameters to a function that generates the gene value, etc. The cataclysm controller can make similar adjustments to sets of genes. After adjusting the bias values, the process ends.

The discussion pertaining to FIG. 3 assumes that each cataclysm strategy includes a default configuration. Thus, after selecting a cataclysm strategy that is different from the previous cataclysm strategy at block 302, the process ends. Similarly, it is assumed that the configuration used for the previous cataclysm strategy, whether the default configuration or not, is persisted. Thus, if the cataclysm controller determines that the previous cataclysm strategy should not be adjusted at block 306, the process ends, and the previous cataclysm strategy will be reused with the same configuration as the previous use. However, the cataclysm controller can be implemented without these assumptions. For example, anytime a cataclysm strategy is selected, it can go through a process similar to the adjustment process illustrated by blocks 310 through 326 in which the initial configuration is determined.

Although the breadth of the potential variations is illustrated by the discussions above, it should be explicitly noted that only a small subset of the possible variations are described. For example, some implementations may only implement a subset of the strategies discussed above, some implementations may implement additional strategies not discussed above, some implementations may implement none of the strategies discussed above, etc. Additionally, only a small subset of the data available for analysis is discussed above. Some implementations may include additional data that can be used to determine the population convergence cause, whether a particular cataclysm strategy should be adjusted, what adjustments to make to a particular cataclysm strategy, etc. Furthermore, migration is described as the migration of a single foreign individual. However, migration can be implemented such that multiple individuals can migrate into a population, from the same or different foreign populations. Cataclysm can be local to a particular deme in a multi-deme simulation or implemented as global cataclysms that apply to all demes in a multi-deme simulation, and the strategies adjusted accordingly. Thus, the inventive subject matter should not be limited to the specific options, features, etc. discussed above.

As example flowcharts, the flowcharts depicted above present operations in an example order from which embodiments can deviate (e.g., operations can be performed in a different order than illustrated and/or in parallel). For example, FIG. 3 depicts the adjustment of the quarantine period length at block 316 as coming before the adjustment of the bias values at block 326. However, the adjustments can be in any order. Furthermore, FIG. 3 also depicts each adjustment as occurring, however, adjustments to a particular cataclysm strategy are optional as long as one adjustment is performed.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
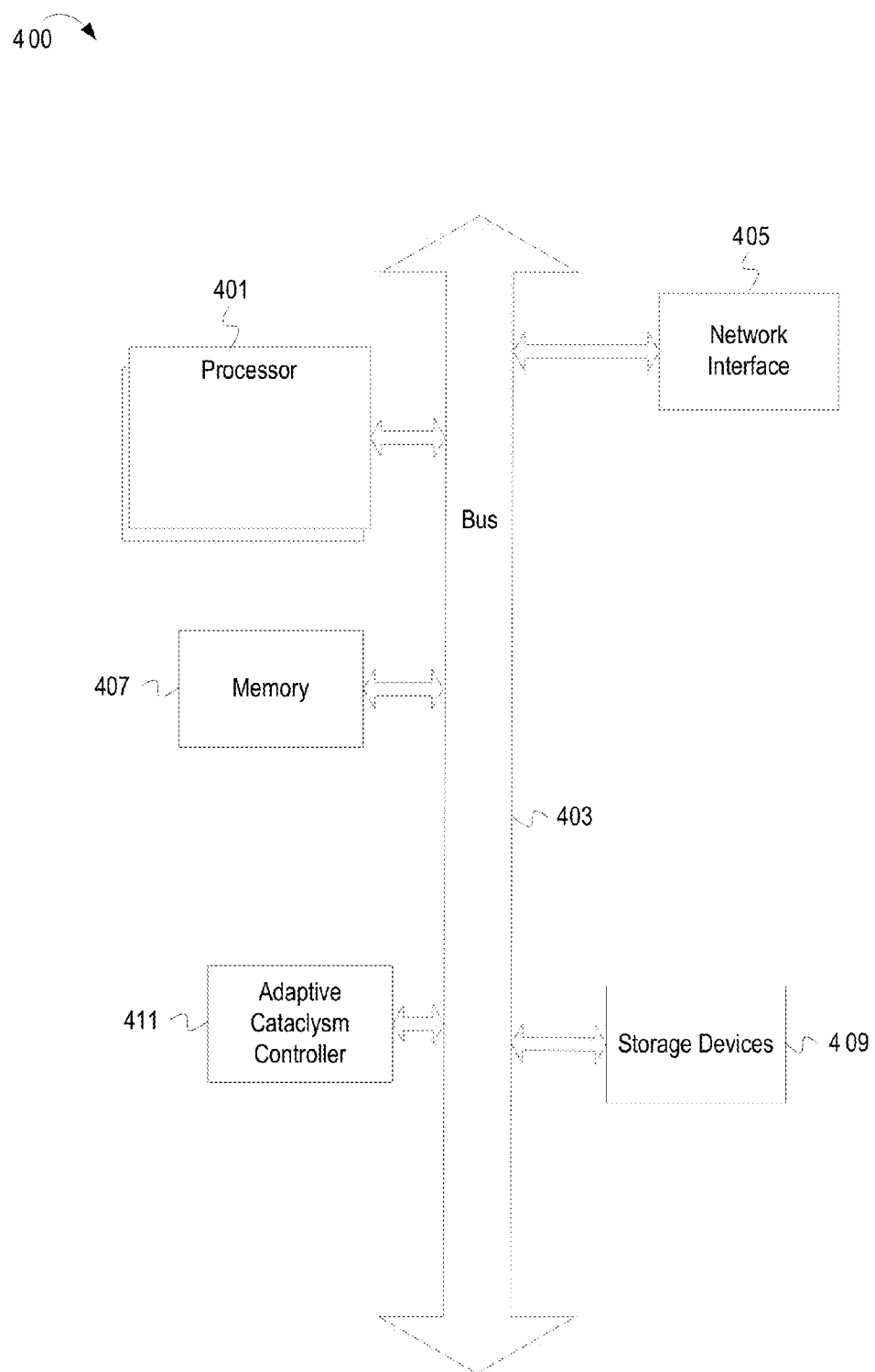
FIG. 4 depicts an example computer system including an adaptive cataclysm controller.

FIG. 4 depicts an example computer system including an adaptive cataclysm controller. A computer system 400 includes a processor unit 401 (possibly including multiple processors, multiple cores, multiple nodes, and/or implementing multi-threading, etc.). The computer system 400 includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 400 also includes a bus 403 (e.g., PCI, ISA, PCI-Express, HyperTransport® bus, InfiniBand® bus, NuBus bus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The computer system 400 also includes an adaptive cataclysm controller 411. The adaptive cataclysm controller 411 embodies functionality to facilitate the functionality described above. For example, the adaptive cataclysm controller 411 embodies functionality allowing it to simulate a population utilizing genetic algorithms. The adaptive cataclysm controller 411 further embodies functionality to determine the cause of a population convergence, select a cataclysm strategy and adjust the cataclysm strategy. Any one of these functionalities may be partially (or entirely) implemented in the memory 407. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for genetic algorithms as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining that a population of candidate solutions for an optimization problem has prematurely converged during a metaheuristic optimization run;
   determining a cause for premature convergence of the population based, at least in part, on an analysis of the metaheuristic optimization run;
   selecting a first cataclysm strategy of a plurality of different cataclysm strategies based, at least in part, on one of the cause of the premature convergence and a history of the metaheuristic optimization run; and
   simulating a cataclysm based, at least in part, on the first cataclysm strategy.

2. The method of claim 1 further comprising:
   determining that the first cataclysm strategy should be adjusted;
   responsive to said determining that the first cataclysm strategy should be adjusted, determining a set of parameters for the first cataclysm strategy; and
   adjusting the first cataclysm strategy in accordance with the set of parameters for the first cataclysm strategy;
   wherein said simulating the cataclysm based, at least in part, on the first cataclysm strategy comprises simulating the cataclysm in accordance with the adjusted first cataclysm strategy.

3. The method of claim 2, wherein said determining that the first cataclysm strategy should be adjusted comprises determining that a number of generations between convergences is below a threshold.

4. The method of claim 2,
   wherein the first cataclysm strategy is a quarantining strategy,
   wherein said adjusting the first cataclysm strategy in accordance with the set of parameters for the first cataclysm strategy comprises adjusting a length of a quarantining period.

5. The method of claim 2,
   wherein the first cataclysm strategy is a migration strategy,
   wherein the migration strategy comprises inserting, into the population, one or more foreign individuals from a first set of one or more foreign populations,
   wherein said adjusting the first cataclysm strategy in accordance with the set of parameters for the first cataclysm strategy comprises at least one of:
      adjusting a length of a quarantining period;
      adjusting a length of a migration delay, wherein one or more foreign individuals are not inserted into the population until after a number of generations indicated by the length of the migration delay; and
      selecting one or more foreign individuals from a second set of one or more foreign populations.

6. The method of claim 2,
   wherein the first cataclysm strategy is a seeding strategy,
   wherein the seeding strategy comprises inserting one or more seeds into the population,
   wherein said adjusting the first cataclysm strategy in accordance with the set of parameters for the first cataclysm strategy comprises at least one of:

adjusting a length of a quarantining period;
adjusting a number of seeds inserted into the population;
adjusting when seeds are inserted into the population; and
adjusting which seeds are inserted into the population.

7. The method of claim 2,
wherein the first cataclysm strategy is a biasing strategy,
wherein said adjusting the first cataclysm strategy in accordance with the set of parameters for the first cataclysm strategy comprises changing a bias value from a set of bias values to another value.

8. The method of claim 1 further comprising:
determining that a previously used cataclysm strategy should not be reused; and
wherein said selecting the first cataclysm strategy of the plurality of cataclysm strategies comprises selecting the first cataclysm strategy of the plurality of cataclysm strategies because the first cataclysm strategy is different than the previously used cataclysm strategy.

9. The method of claim 1, wherein the history of the metaheuristic optimization run comprises at least one of a cataclysm count and a convergence rate, wherein the convergence rate is indicated by at least one of a number of generations between convergences and a number of convergences per a number of generations.

10. The method of claim 9, wherein said selecting the first cataclysm strategy of the plurality of cataclysm strategies based, at least in part, on one of the cause of the premature convergence and the history of the metaheuristic optimization run comprises:
determining that the convergence rate is below a threshold;
wherein said selecting the first cataclysm strategy of the plurality of cataclysm strategies is responsive to said determining that the convergence rate is below the threshold.

11. The method of claim 9, wherein said selecting the first cataclysm strategy of the plurality of cataclysm strategies based, at least in part, on one of the cause of the premature convergence and the history of the metaheuristic optimization run comprises:
determining that the convergence rate is above a threshold; and
wherein said selecting the first cataclysm strategy of the plurality of cataclysm strategies is responsive to said determining that the convergence rate is above the threshold.

12. The method of claim 1, wherein the analysis of the metaheuristic optimization run comprises at least one of:
determining that one or more candidate solutions in the population of candidate solutions is associated with one or more tokens;
analyzing the history of the metaheuristic optimization run; and
analyzing a set of genes associated with each of one or more candidate solutions in the population of candidate solutions.

13. The method of claim 1, wherein the different cataclysm strategies comprise a quarantining strategy, a migration strategy, a seeding strategy, and a biasing strategy.

14. The method of claim 1, wherein the first cataclysm strategy of the plurality of different cataclysm strategies comprises a first set of parameters, and wherein a second cataclysm strategy of the plurality of different cataclysm strategies comprises a second set of parameters different from the first set of parameters.

15. The method of claim 14, wherein the first set of parameters and the second set of parameters include different member subsets from a set of parameters consisting of a mass extinction parameter, a quarantining parameter, a migration parameter, a seeding parameter, and a biasing parameter.

16. The method of claim 14, wherein the selecting the first cataclysm strategy comprises:
determining, based on the history of the metaheuristic optimization run, that the second cataclysm strategy was used to perform one or more prior cataclysms using the second set of parameters; and
selecting the first cataclysm strategy in place of the second cataclysm strategy in response to determining that modifying values for the second set of parameters would be less likely to provide fitter candidate solutions than using the first set of parameters from the first cataclysm strategy.

17. The method of claim 14, wherein the second set of parameters comprises a first parameter that randomly mutates one or more of the population of candidate solutions, and wherein the selecting the first cataclysm strategy comprises determining that random mutations of the one or more of the population of candidate solutions would be less likely to provide fitter candidate solutions than using a second cataclysm parameter from the first cataclysm strategy, wherein the second cataclysm parameter comprises one or more of a quarantining parameter, a migration parameter, a seeding parameter, and a biasing parameter.

* * * * *